United States Patent
Heinrich et al.

(10) Patent No.: US 12,534,134 B2
(45) Date of Patent: Jan. 27, 2026

(54) CONNECTION APPARATUS, AND ARRANGEMENT FOR A VEHICLE FOR DOUBLE-SHEARING CONNECTION OF A DRIVE TRAIN COMPONENT TO A BODY AND TO A SUPPORT STRUCTURE, AND AN ASSOCIATED MOTOR VEHICLE AND METHOD

(71) Applicant: AUDI AG, Ingolstadt (DE)

(72) Inventors: Maximilian Heinrich, Ingolstadt (DE); Marco Isliker, Ingolstadt (DE); Carmen Sand, Ingolstadt (DE); Almar-Otto Schmid, Eichstätt (DE)

(73) Assignee: AUDI AG, Ingolstadt (DE)

( * ) Notice: Subject to any disclaimer, the term of this patent is extended or adjusted under 35 U.S.C. 154(b) by 299 days.

(21) Appl. No.: 18/482,113

(22) Filed: Oct. 6, 2023

(65) Prior Publication Data
US 2024/0116352 A1    Apr. 11, 2024

(30) Foreign Application Priority Data
Oct. 10, 2022   (DE) .......................... 102022126036.4

(51) Int. Cl.
*B60K 1/04*    (2019.01)
*B62D 21/11*   (2006.01)
(Continued)

(52) U.S. Cl.
CPC ............... *B60K 1/04* (2013.01); *B62D 21/11* (2013.01); *B62D 21/155* (2013.01);
(Continued)

(58) Field of Classification Search
CPC ........ B60K 1/04; B62D 21/11; B62D 21/155; B62D 27/065; B62D 25/20; H01M 50/249; H01M 50/262; H01M 2220/20
See application file for complete search history.

(56) References Cited

U.S. PATENT DOCUMENTS

| 2004/0046381 A1* | 3/2004 | Yoshida ................. B62D 21/11 280/784 |
| 2015/0239331 A1* | 8/2015 | Rawlinson ........... B62D 21/157 180/68.5 |

FOREIGN PATENT DOCUMENTS

DE         197 03 951 A1   8/1997
DE    10 2008 015 182 A1   9/2009
(Continued)

OTHER PUBLICATIONS

German Office Action issued in counterpart German Application No. 10 2022 126 036.4 dated Apr. 21, 2023.

*Primary Examiner* — Timothy Hannon
(74) *Attorney, Agent, or Firm* — STAAS & HALSEY LLP (57) ABSTRACT

A connection apparatus and an arrangement for a motor vehicle may be provided for a double-shearing connection of a drive train component to a body and to a support structure. A support element of the connection apparatus may have a first interface to connect the support element to the support structure of a motor vehicle component. The support element may have a second interface to connect the support element to an auxiliary frame of the drive train component. An auxiliary frame screw of the connection apparatus may be constructed to connect the auxiliary frame at the lower side to the second interface of the support element and at the upper side to the body.

14 Claims, 3 Drawing Sheets

(51) Int. Cl.
  *B62D 21/15* (2006.01)
  *H01M 50/249* (2021.01)
  *H01M 50/262* (2021.01)
(52) U.S. Cl.
  CPC ....... *H01M 50/249* (2021.01); *H01M 50/262* (2021.01); *H01M 2220/20* (2013.01)

(56) References Cited

FOREIGN PATENT DOCUMENTS

| DE | 10 2011 104 460 A1 | 12/2011 |
| DE | 10 2011 104 865 A1 | 12/2012 |
| DE | 10 2012 024 145 A1 | 6/2014 |
| DE | 10 2015 219 319 A1 | 4/2017 |
| DE | 10 2018 205 171 A1 | 10/2019 |
| DE | 10 2020 131 280 A1 | 6/2022 |
| DE | 20 2015 102 177 U1 | 8/2023 |

* cited by examiner

CONNECTION APPARATUS, AND ARRANGEMENT FOR A VEHICLE FOR DOUBLE-SHEARING CONNECTION OF A DRIVE TRAIN COMPONENT TO A BODY AND TO A SUPPORT STRUCTURE, AND AN ASSOCIATED MOTOR VEHICLE AND METHOD

CROSS-REFERENCE TO RELATED APPLICATIONS

This application claims the benefit of German Application No. 10 2022 126 036.4 filed on Oct. 10, 2022, in the German Intellectual Property Office, the disclosure of which is incorporated herein by reference in its entirety.

BACKGROUND

1. Field

The described examples of an invention relate to a connection apparatus for a motor vehicle for a double-shearing connection of an auxiliary frame of a first drive train component to a body and to a support structure of a motor vehicle component, and an arrangement for a motor vehicle which comprises a body, a first drive train component, a motor vehicle component and a connection apparatus. The described examples of the invention further relate to an associated motor vehicle and an associated method.

2. Description of Related Art

An important aspect in modern vehicle development is to ensure the safety of the occupants of a motor vehicle during travel, but also in particular in the event of an accident or crash of the motor vehicle. Furthermore, it may be necessary for sensitive components and systems of the motor vehicle to also have to be protected in the event of crash in order to be able to ensure the safety of the occupants. For example, it may be necessary to protect high-voltage systems of a battery-operated electric vehicle (battery electric vehicle, BEV), driver assistance systems or systems for highly automated or autonomous driving. Accordingly, there may be provision for the motor vehicle to have to have a robust or rigid frame which even in the event of a crash can withstand the forces which occur.

In addition to the motor vehicle safety, another aspect in the vehicle development is that sufficient structural space for necessary motor vehicle components, but also space for the passengers can be provided by the motor vehicle.

SUMMARY

In an example, safety of the occupants and sensitive motor vehicle components in a motor vehicle may be improved and at the same time a space for motor vehicle components and/or occupants may be increased.

The described examples may be achieved by the aspects of subject-matter of the independent patent claims. Advantageous further developments of the described examples of the invention are described by the dependent patent claims, the following description and the Figures.

As a result of an aspect of an example, a connection apparatus for a motor vehicle for a double-shearing connection of an auxiliary frame of a first drive train component to a body and to a support structure of a motor vehicle component may be provided. In an example, a support element of the connection apparatus has a first interface for connecting the support element to the support structure of the motor vehicle component. The support element has a second interface for connecting the support element to the auxiliary frame. In an example, an auxiliary frame screw of the connection apparatus may be constructed to connect the auxiliary frame at the lower side to the second interface of the support element and at the upper side to the body.

By such a connection apparatus, a force which acts, for example, as a result of a crash of the motor vehicle on the first drive train component can be selectively introduced into the body and into the support structure. Consequently, the force can advantageously be divided via the connection apparatus over at least two load paths, via the body and the support structure. It is thus advantageously possible using the connection apparatus to ensure an additional load path, that is to say, additionally into the support structure. In an example, the pressure on the connection of the auxiliary frame to the body can thereby be relieved so that this connection location can be sized to be smaller. Consequently, material can be saved and a weight of the motor vehicle can be optimized or reduced.

Furthermore, as a result of the additional load path, which can be provided by the connection apparatus, a rigidity of the motor vehicle, for example at the connection of the auxiliary frame can be increased so that a maximum load level in the event of a crash can advantageously be increased. Consequently, the safety of the motor vehicle, for example, a crash performance, can be significantly improved.

In an example, as a result of the improved rigidity, for example an intrusion rigidity, an intrusion in the motor vehicle as a result of a crash, for example the intrusion of the first drive train component into another motor vehicle component and/or in the direction of a passenger space, can be reduced. Accordingly, it may become possible, as a result of the connection apparatus, for previously required free spaces in the motor vehicle, for example between the first drive train component and the motor vehicle component, to be able to be reduced or eliminated since these free spaces may no longer required as safety spacing or as crumple zones in the event of a crash. Consequently, a structural space for accommodating a drive train motor vehicle component or another motor vehicle component and/or the passenger space in the event of unchanged outer dimensions of the motor vehicle can advantageously be increased.

A double-shearing connection may be understood to be a connection which may be loaded by shearing, wherein two shearing faces of a positive-locking connection may be loaded. For example, the shearing faces may correspond to a face, which protrudes perpendicularly to a longitudinal axis, of the sheared component. The sheared component may, for example, be a screw, a rivet, a bolt, a feather key, or the like, on which a force acts transversely relative to the longitudinal axis.

In an example, in a mounted state, that is to say, in which the auxiliary frame of the drive train component is connected to the support element and the body by means of the connection apparatus, the auxiliary frame screw may be loaded with double shearing. In an example, the auxiliary frame screw in the event of a crash of the motor vehicle may be loaded in terms of shearing. Preferably, a first shearing face of the auxiliary frame screw may be able to be loaded at the connection between the auxiliary frame and the body and a second shearing face of the auxiliary frame screw may be able to be loaded at the connection between the auxiliary frame and the support element.

The connection apparatus may be provided and suitable for connecting the predetermined auxiliary frame of the first drive train component both to the predetermined body and to the predetermined support structure of the motor vehicle component so that forces from the auxiliary frame can be transferred via two paths.

The auxiliary frame may be a supporting, force-absorbing and/or rigid structure which is suitable for receiving or storing components or sub-assemblies of the first drive train component. For example, the auxiliary frame may have profiles, struts, carriers or the like. Furthermore, the auxiliary frame may be suitable for absorbing and transmitting a force as a result of a crash of the motor vehicle. In an example, the auxiliary frame may have a first connection location for connection to the body and a second connection location for connection to the support element, by which the force can be transmitted.

The support structure may be a supporting, force-absorbing and/or rigid structure which is suitable for receiving or storing components or sub-assemblies of the motor vehicle component. For example, the support structure may have profiles, struts, carriers or the like. Furthermore, the support structure may be suitable for absorbing and transmitting a force as a result of a crash of the motor vehicle. In an example, the support structure may have a first connection location for connection to the body and a second connection location for connection to the support element, by which the force can be transmitted.

The connection apparatus may substantially have the support element and the auxiliary frame screw. The support element may be a supporting, force-absorbing and/or rigid structure. For example, the support element may have profiles, struts, carriers or the like. Furthermore, the support element may be suitable for absorbing and transmitting a force as a result of a crash of the motor vehicle. In an example, the support element has a first interface for connection to the support structure and a second interface for connection to the auxiliary frame, by which the force can be transmitted.

The auxiliary frame screw of the connection apparatus may be constructed to connect the auxiliary frame at the lower side to the second interface of the support element and at the upper side to the body. In other words, the auxiliary frame screw may be constructed to connect the second interface to a lower side of the auxiliary frame and the body to an upper side of the auxiliary frame. When viewed in a vertical direction, the lower side may be a lower side of the auxiliary frame in a provided arrangement of the auxiliary frame in the motor vehicle. The upper side may, when viewed in the vertical direction, be an upper side of the auxiliary frame in the provided arrangement of the auxiliary frame in the motor vehicle. The upper side may be opposite the lower side.

The auxiliary frame screw may have a screw head and a screw shaft. In an example, the screw shaft may have a thread-free portion and a threaded portion. The screw shaft, for example the thread-free portion, may be constructed to be able to be connected to a hole of the auxiliary frame, for example, in a positive-locking manner, and to the second interface of the support element. In an example, the threaded portion may be provided to be screwed into a predetermined threaded hole of the body. The screw head may be constructed for being received in a tool so that the threaded portion can be screwed into the threaded hole. For example, the screw head may be constructed to connect the second interface of the support element to the auxiliary frame and the auxiliary frame to the body in a non-positive-locking manner by the screw head being pressed by screwing onto the second interface, and the second interface being pressed onto the auxiliary frame and the auxiliary frame being pressed onto the body. For example, the second interface and the auxiliary frame may be able to be connected in a so-called sandwich connection between the screw head and the body.

The term "connection" may be understood to be a secure or rigid connection, by which forces and torques, for example, as a result of a crash, can be transmitted. Accordingly, there may be a provision for the respective connection to have a corresponding robustness which can withstand a crash or a predetermined loading resulting from a crash as long as a loose connection is not expressly referred to. The same applies accordingly to the term "be connected."

One example may make provision for the first interface to have at least a first bore hole for connecting the support element to the support structure of the motor vehicle component using a screw. In an example, there may be a provision for the second interface to have a second bore hole for connecting the support element to the auxiliary frame by way of the auxiliary frame screw. In an example, there may be a provision for a central line or a bore hole center axis of the at least one first bore hole of the first interface to be constructed perpendicularly to a central line or bore hole center axis of the second bore hole of the second interface.

In an example, the second bore hole can be connected in a positive-locking manner to the screw shaft of the auxiliary frame screw. In an example, an edge of the second bore hole can be connected by way of the screw head to the auxiliary frame in a non-positive-locking and/or positive-locking manner.

The mutually perpendicular construction of the first bore hole with respect to the second bore hole may, for example, have the advantage that the second bore hole can be connected with a vertically guided screw and the first bore hole can be connected with a horizontally guided screw. Consequently, it is advantageously possible to connect the first interface and the second interface from different directions. For example, the second interface may be connected from below to the auxiliary frame using the auxiliary frame screw and the first interface may be connected to the support structure from a wide side of the motor vehicle by way of a screw. This may for example be advantageous in an automated assembly method of the connection apparatus.

One example may make a provision for the support element to be constructed in a fork-like manner and to have a fork shaft and two fork arms. In an example, a cross section of the support element may be constructed in a fork-like manner. The term "fork-like" or "Y-shaped" may refer to a form which is constructed, extending from a fork shaft in two directions, to divide into two fork arms or which is similar to the shape of a fork. In an example, the two fork arms can be connected to each other by way of a transverse strut to improve a stability of the support element.

In an example, there may be a provision for the first interface to have two first bore holes, wherein one of the two first bore holes is formed in each case at a respective end of the two fork arms. In other words, a first distal end of one of the two fork arms may have a first of the two first bore holes and a second distal end of another of the two fork arms may have a second of the two first bore holes.

As a result of this example of the support element, an advantage may be afforded inter alia that a force, for example, resulting from a crash, can be divided by the fork shaft over the two fork arms. As a result of this load distribution, a stability of the support element can be increased. Another advantage is that, as a result of three connection locations of the support element, comprising the two first bore holes and the second bore hole, a statically determined connection between the auxiliary frame and the support structure can be produced. This may have an advantageous effect on the statics and the stability of the motor vehicle.

The fork shape of the support element may be considered to be purely an example. Any other form of the support element which appears advantageous for use as a support element may be selected.

As a result of another aspect of an example, an arrangement for a motor vehicle is provided. The arrangement may include the body, the first drive train component, the motor vehicle component and the connection apparatus according to the described examples.

In an example, the support structure of the motor vehicle component may be connected to the support element by way of the first interface of the support element. In an example, the second connection location of the support structure may be connected to the first interface of the support element, for example, screwed or connected by a bolt. In an example, the support structure may have or form a console, wherein the console of the support structure has or forms the second connection location. For example, the console, constructed as a load-bearing projection, may be connected to the support structure, for example, screwed, welded or the like, and the console may be connected to the support element. Such an example may be advantageous, particularly during the assembly of the arrangement, and have a positive effect on the stability of the arrangement.

In an example, the auxiliary frame of the first drive train component may be connected to the support element by way of the auxiliary frame screw at the lower side via the second interface of the support element and at the upper side to the body. In an example, the second connection location of the auxiliary frame may be connected at the lower side of the auxiliary frame by way of the auxiliary frame screw to the second interface of the support structure. In particular, the first connection location of the auxiliary frame can be connected to the body at the upper side of the auxiliary frame by way of the auxiliary frame screw. In an example, the second interface of the support element and the second connection location of the auxiliary frame may be connected to each other by way of the auxiliary frame screw in a so-called sandwich connection. In particular, the auxiliary frame of the first drive train component may be connected in a double-shearing manner to the body, on the one hand, and to the support structure via the support element, on the other hand.

In other words, by the arrangement, the support structure of the motor vehicle component can be connected to the auxiliary frame, for example to an auxiliary frame bearing, via the auxiliary frame screw. Consequently, a crash pathway can advantageously additionally be coupled to a load path of the support structure. In an example, a first crash pathway may lead to the body from the auxiliary frame via the auxiliary frame screw at a first connection location of the auxiliary frame to the body. In particular, a second crash pathway may lead from the auxiliary frame via the auxiliary frame screw at a second connection location of the auxiliary frame to the support element via the support element to the support structure.

By such an arrangement, a force which acts, for example, as a result of a crash of the motor vehicle, on the first drive train component, in particular on the auxiliary frame, can be introduced in a selective manner into the body and into the support structure. The force can consequently advantageously be divided by the auxiliary frame via the connection apparatus over at least two load paths, via the body and the support structure. With the arrangement, an additional load path, that is to say, additionally in the support structure, can consequently advantageously be ensured. In an example, the pressure on the connection of the auxiliary frame to the body can thereby be relieved so that this first connection location can be sized to be smaller. Material can consequently be saved and a weight of the motor vehicle can be optimized or reduced.

Furthermore, as a result of the additional load path which is provided by the connection apparatus, a rigidity of the motor vehicle, for example at the connection of the auxiliary frame, can be increased so that a maximum load level can advantageously be increased in the event of a crash. Consequently, the safety of the motor vehicle, for example a crash performance, can be significantly increased.

In an example, as a result of the improved rigidity, an intrusion in the motor vehicle as a result of a crash, for example, of the first drive train component into or in the direction of the motor vehicle component and/or in the direction of a passenger space, can be reduced. Accordingly, as a result of the connection apparatus, it may become possible for previously required free spaces in the motor vehicle, in particular between the first drive train component and the motor vehicle component, to be able to be reduced or eliminated since these free spaces may no longer required as safety spacing or as a crumple zone in the event of a crash. Consequently, a structural space for accommodating a drive train motor vehicle component or another motor vehicle component and/or the passenger space can advantageously be increased without the external dimensions of the motor vehicle being changed.

The fact that the support structure is not connected directly to the auxiliary frame but instead via the support element and where applicable via the console, may be advantageous during the assembly of the arrangement. For example, as a result of the multicomponent nature resulting from the additional support element, corresponding shape, position and/or production tolerances of the respective components of the arrangement can be taken into account or compensated for.

Another advantage is that the first interface can be released independently of the auxiliary frame screw. It is thereby, for example, possible to ensure that the motor vehicle component can be disassembled or removed from the arrangement, wherein during the disassembly or change of the motor vehicle component the connection between the first drive train component and the body remains untouched. Consequently, it is possible to dispense with the operating step of connecting the first drive train component to the body again during disassembly of the motor vehicle component so that in particular an adjustment or measurement of the drive train component with respect to the body can be saved. Consequently, a disassembly or a replacement of the motor vehicle component can be carried out in a significantly more effective manner.

The body may be understood to be the supporting base frame of the motor vehicle, for example the supporting chassis. In an example, the body may be a so-called self-supporting body. The body may have a large number of connection locations for connecting the auxiliary frame and the support structure to the body. The body may comprise a plurality of components, for example, profiles, webs, carriers, etcetera, for example made of steel, which may be arranged longitudinally, transversely and/or diagonally and which may be connected securely or rigidly to each other.

The term "drive train" may include all components and/or sub-assemblies of the motor vehicle which contribute to the task of moving the motor vehicle using the power generated by a motor. For example, one or more of the following components or sub-assemblies may be a drive train component or belong to a drive train component: the motor, an energy store, a coupling, a gear mechanism, a drive shaft, an axle differential and/or the like.

The arrangement may in particular comprise a plurality of, for example two connection apparatuses for connecting the auxiliary frame to the support structure and to the body at two locations.

In an example, a configuration of the arrangement makes provision for the first drive train component to correspond to a front drive or a rear drive for the motor vehicle. The front drive or the rear drive may comprise the auxiliary frame and, for example, a motor, in particular an electric motor, a partial gear mechanism, a differential and wheel suspensions and wheels, and additional components or sub-assemblies.

In an example, in the event of a rear-end collision, the auxiliary frame of the rear drive of a front motor vehicle or the auxiliary frame of the front drive of a rear motor vehicle may be loaded, in particular with a force acting in a longitudinal vehicle direction. In order to prevent or at least significantly to reduce the intrusion of the front or rear drive in the direction of another motor vehicle component, as a result of the arrangement the force can advantageously be transmitted into the body and into the motor vehicle component.

Another advantage may be that a free space between the front drive and the rear drive and the motor vehicle component may be reduced and consequently, for example, the motor of the front drive or the rear drive with a specific length of the motor vehicle can be increased. Consequently, by the arrangement according to this example, the motor vehicle can, for example, provide an improved drive power as a result of a larger motor.

In an example, a configuration of the arrangement makes provision for the motor vehicle component to correspond to a second drive train component or a component of the body. The motor vehicle may substantially comprise the body and the drive train. The motor vehicle component may accordingly be a body component or a drive train component. For example, the auxiliary frame of the first drive train component may be connected via the first connection location thereof to a first body component and via the second connection location thereof by the support element to the support structure of a second body component or to the second drive train component. The second drive train component may in turn be connected to the body and/or to additional motor vehicle components.

In an example, a configuration of the arrangement makes provision for the motor vehicle component to correspond to an energy store for the motor vehicle, for example a high-voltage battery (HVB). The energy store may correspond to the second drive train component.

The energy store which may, for example, also be in the form of a robust hydrogen tank or the like or in the form of, for example, a high-voltage battery (HVB) may constitute a sensitive motor vehicle component, which may be worthy of protection, of the motor vehicle, for example, in the event of a crash, particularly since damage to the energy store may represent a significant danger for the passengers of the motor vehicle. For example, a damaged HVB may catch fire. The energy store may comprises the support structure.

Since by the arrangement or by the connection apparatus a force may be distributed from the first drive train component, for example a front or rear drive, to the body and the support structure of the energy store, an intrusion of the first drive train component in the direction of the energy store or into the energy store in the event of a crash can advantageously be prevented or significantly reduced.

Another advantage may be that a free space between the first drive train component and the energy store may be reduced and consequently the energy store can be increased for a specific length of the motor vehicle. Consequently, by the arrangement according to this example, the motor vehicle can absorb more energy in an increased energy store so that a higher capacity and consequently also a higher range of the motor vehicle can be achieved.

In an example in which the first drive train component is a front drive or a rear drive and the motor vehicle component is an HVB, other advantages may be afforded. For example, it may be possible for the HVB to be able to be disassembled by releasing the first interface, wherein a connection of the front drive or the rear drive to the body, for example the auxiliary frame screw, can remain untouched. Consequently, it may be possible that, when the HVB is changed, the drive does not have to be newly adjusted and/or measured. A change of the HVB can thereby be carried out in a significantly more effective manner.

The described examples may also include further developments of the arrangement which may have features as have already been described in connection with the further developments of the connection apparatus. For this reason, the corresponding further developments of the arrangement according to the examples may not be described again here.

As a result of another aspect of examples of the invention, a motor vehicle is provided. The motor vehicle comprises in particular the arrangement according to the described examples. The motor vehicle may comprise a plurality of arrangements.

The motor vehicle according to the examples of the invention may be in the form of a car, in particular a passenger vehicle, or truck, or a passenger bus, or motorcycle.

In an example, the motor vehicle makes provision for the connection apparatus to be constructed in such a manner that the first interface has at least the first bore hole for connecting the support element to the support structure of the motor vehicle component using a screw and the second interface has the second bore hole for connecting the support element to the auxiliary frame using the auxiliary frame screw and the central line of the at least one first bore hole of the first interface is constructed perpendicularly to the central line of the second bore hole of the second interface. Furthermore, there is provision for the connection apparatus to be arranged in a lateral edge region of the motor vehicle in a vehicle width direction and in a lower edge region of the motor vehicle in a vertical vehicle direction. Furthermore, there is provision for the central line of the at least one first bore hole of the first interface to be constructed in the vehicle width direction and a central line of the bore hole of the second interface to be constructed in the vertical vehicle direction.

In other words, the connection apparatus may be arranged in the edge region of the motor vehicle, which edge region may be located laterally in the vehicle width direction and at the bottom in the vertical vehicle direction. The vehicle width direction is intended to be understood to be a direction of the motor vehicle which extends substantially parallel with a drive axis and perpendicularly to a forward direction of the motor vehicle. The term "laterally" can consequently also be understood to be both left and right on the motor vehicle. The vertical vehicle direction may be understood to be a vertical direction when the motor vehicle is located in a horizontal position.

As a result of the position of the connection apparatus in the laterally lower edge region of the motor vehicle and the provided orientations of the respective central lines of the bore holes, it may advantageously be possible for the second interface to be accessible from below during assembly or disassembly of the connection apparatus and for the first interface to be accessible from a side of the motor vehicle. For example, the first interface of the support element may be able to be screwed to the support structure or unscrewed from the side. For example, the auxiliary frame screw may be able to be screwed from below in an upward direction through the second bore hole and the hole of the auxiliary frame into the body. In an example, as a result of such a positioning of the connection apparatus, an automated assembly of the connection of the motor vehicle as a result of the improved accessibility, from the side and from below, can be optimized.

In an example, in which the first drive train component is a front drive or a rear drive and the motor vehicle component is an HVB, other advantages may be afforded with such a positioning of the connection apparatus. For example, a disassembly of the HVB from the motor vehicle by releasing the first interface can be carried out from the side. For example, there may be provision for a front wheel or a rear wheel to be disassembled initially so that the first interface in the lateral edge region of the motor vehicle is accessible for release. Consequently, a change of the HVB can be carried out in a simple and more efficient manner.

The described example of the invention may also include further developments of the motor vehicle according to the described examples of the invention which have features as already described in connection with the further developments of the connection apparatus according to described examples of the invention and the arrangement according to the described examples of the invention. For this reason, the corresponding further developments of the motor vehicle according to the described examples of the invention may not be described again here.

As a result of another aspect of the described examples of the invention, a method for a double-shearing connection of the auxiliary frame of the first drive train component to the body and to the support structure of the motor vehicle component of the motor vehicle may be provided. In the method, for example the first interface of the support element may be connected to the support structure of the motor vehicle component and the auxiliary frame of the first drive train component may be connected by the auxiliary frame screw at the lower side to the second interface of the support element and at the upper side to the body. In an example, the method may constitute a highly automated assembly method.

In an example, the connection of the auxiliary frame to the support element and to the body using the auxiliary frame screw may represent one operating step, which can be carried out for example by introducing the auxiliary frame screw through the first interface and through the auxiliary frame and by screwing into the body.

An example of the method may make provisions for the following steps: a) loosely connecting the first interface of the support element to the support structure of the motor vehicle component forming play; b) connecting the support structure to the body after step a); c) connecting the auxiliary frame at the lower side to the second interface of the support element and at the upper side to the body by the auxiliary frame screw after step a); d) securely connecting the first interface to the support structure after steps a) to c).

Firstly, the step a) can be carried out. With the loose connection, the support element can conditionally be movably connected relative to the support structure. For example, the loose connection may be understood to be a connection with a screw and a screw nut, wherein a screw nut is mounted only loosely on the screw. The play may be understood to be the movement freedom in which the support element can at least conditionally be moved with respect to the support structure. In an example, it is possible in this instance to refer to a floating support of the support element on the support structure. At least the support element and the support structure can be pre-positioned by the step a).

The steps b) and c) can be carried out in particular one after the other or at the same time.

The support structure may, for example, be connected to the body by at least one support structure screw, for example a plurality of support structure screws. The auxiliary frame can be connected to the body by at least two auxiliary frame screws.

After the support structure is securely connected to the body and the auxiliary frame is securely connected to the support element and the body, in step d) the initially loose connection of the support element can be securely connected to the support structure.

One advantage of such a method is that a connection of the support structure to the auxiliary frame can be enabled initially with production-related deviations in the shape or in the position relative to the body of the support structure or the auxiliary frame. In this instance, for example two aspects of the method may be highly significant. On the one hand, as a result of the use of the support element, it can be ensured that production-related deviations can be compensated for. On the other hand, as a result of the sequence of the method steps, it can be ensured that the production-related deviations can be compensated for. If such a "compensation function" were not integrated, it may be the case that the connection locations of the motor vehicle component and the auxiliary frame no longer fit the receiving locations of the body. Consequently, an assembly would not be possible or only with considerable adjustment complexity.

Another advantage may be that the method can be carried out in a highly automated manner, for example on an assembly belt by automated robots.

The described examples of the invention may also include further developments of the method according to the described examples of the invention which have features as have already been described in connection with the further developments of the motor vehicle according to the described examples of the invention, the arrangement according to the described examples of the invention and the connection apparatus according to the described examples of the invention. For this reason, the corresponding further developments of the method according to the described examples of the invention may not described again here.

The described examples of the invention may also include the combinations of the features of the examples described. Therefore, the described examples of the invention may also include examples which each have a combination of the features of a plurality of the examples described as long as the examples have not been described as being mutually exclusive.

BRIEF DESCRIPTION OF THE DRAWINGS

Examples of the invention are described below with reference to the drawings. In the drawings.

DESCRIPTION

Examples of the invention are explained below. In the examples, the described components may illustrate individual features which are intended to be considered in each case independently of each other and which also further develop the examples independently of each other. Therefore, the disclosure should also include combinations of the features of the examples other than those illustrated. Furthermore, the examples described can also be supplemented by other features of the invention in addition to those already described.

In the Figures, identical reference numerals refer in each case to elements which have an identical function.

A connection of the examples shown may be understood to be a fixed or rigid connection by which forces and torques, for example, resulting from a crash, can be transmitted. Accordingly, there may be provision for the respective connection to have a corresponding robustness, which can withstand a crash or a predetermined loading resulting from a crash as long as a loose connection is not expressly mentioned. The same applies accordingly to the term "be connected".

Figure 1:
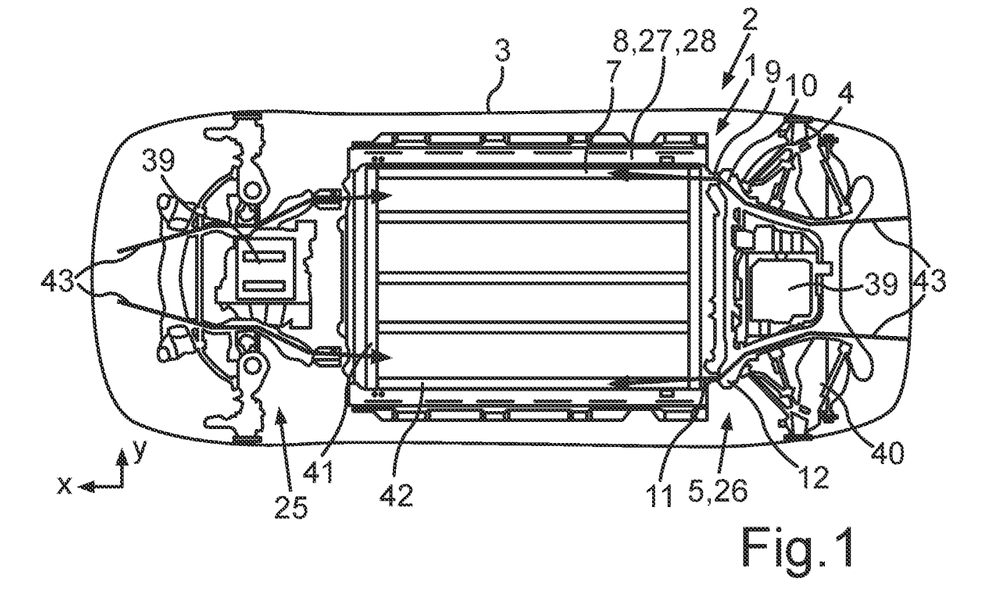
FIG. 1 shows a schematic illustration of a motor vehicle according to an example.

FIG. 1 shows a schematic illustration of a motor vehicle 3 according to an example in an XY plane as a plan view, wherein an X direction corresponds to a longitudinal vehicle direction X and a Y direction corresponds to a vehicle width direction Y.

In the example shown, there are shown substantially three drive train components which may include the motor vehicle 3, for example, a front drive 25, a rear drive 26 which in this example represents a first drive train component 5, and a high-voltage battery (HVB) 28 which in this example represents a motor vehicle component 8 or a second drive train component 27. Alternatively, the motor vehicle component 8 may also be in the form of a component of a body 6 of the motor vehicle 3.

For example, the front drive 25 may comprise an electric motor 39, and additional components or sub-assemblies, such as a partial gear mechanism, a steering apparatus, a frame or the like. The front drive 25 may also correspond to the first drive train component 5 and be connected via a connection apparatus 1 according to the described examples, to the motor vehicle component 8, in this instance the HVB 28, for example to a support structure 7 of the HVB 28.

For example, the rear drive 26 may comprise an additional electric motor 39 and additional components or sub-assemblies, such as a partial gear mechanism, a frame, in an example an auxiliary frame 4, or the like. The rear drive 26 may be connected particularly via the connection apparatus 1 according to the described examples to the HVB 28, in an example to the support structure of the HVB 28.

The HVB 28 has in this example the support structure 7 which may comprise, for example, a front and a rear transverse profile 41 and a plurality of longitudinal profiles 42, wherein in an example the transverse profiles 41 and the longitudinal profiles may be securely or rigidly connected to each other and may have a corresponding robustness. In an example, the support structure 7 may be configured to support the HVB 28 in a stable manner. In addition, the support structure may be constructed to absorb or transmit forces which may be introduced, for example as a result of a crash of the motor vehicle 3, via the connection apparatus 1 from the support structure 7.

In this example, the connection apparatus 1 may be arranged in the longitudinal vehicle direction X substantially between the motor vehicle component 8 and the first drive train component 5. However, the connection apparatus 1 may not limited to this positioning. For example, the connection apparatus 1 may be arranged in the vehicle width direction Y beside the motor vehicle component 8. In example, the connection apparatus 1 is positioned in such a manner that it is accessible for connection to or release from the motor vehicle component 8 and/or the first drive train component 5 using a tool. In this example, the connection apparatus 1 may be arranged in a lateral edge region of the motor vehicle 3 in the vehicle width direction Y and in a lower edge region of the motor vehicle 3 in the vertical vehicle direction Z so that the connection apparatus 1 is accessible from below and from the side of the motor vehicle 3, for example, via a wheel case by disassembling a wheel.

The auxiliary frame 4 of the first drive train component 5 may in an example be constructed to carry and support the components and sub-assemblies of the drive train component 5. In an example, the auxiliary frame 4 may be constructed to absorb and transmit forces external to the motor vehicle, for example, resulting from a crash of the motor vehicle 3. Accordingly, the auxiliary frame 4 may be constructed to be sufficiently robust and rigid.

In this example, the auxiliary frame 4 can be connected to two auxiliary frame carriers 44 by a connection apparatus 1 in each case, laterally at the right and left. The connection apparatus 1 may be suitable for connecting the auxiliary frame 4 of the first drive train component 5 to the body 6 and to the support structure 7 of the motor vehicle component 8 in a double-shearing manner. In an example, the connection apparatus 1 may be constructed to absorb forces external to the motor vehicle, resulting, for example, from a crash of the motor vehicle 3, from the auxiliary frame 4 and to transmit them both to the body 6 and to the support structure 7. Accordingly, the connection apparatus 1 may be constructed to be sufficiently robust or rigid. In an example, as a result of this connection, the crash pathways 43 of the auxiliary frame 4 can advantageously be coupled to the load paths of the support structure 7.

Particularly as a result of the connection by the connection apparatus 1, an improved rigidity, in an example an intrusion rigidity, can be achieved and consequently an intrusion in the motor vehicle 3 as a result of a crash, in an example of the first drive train component 5 into the motor vehicle component 8 and/or in the direction of a passenger space can be prevented or at least reduced. Accordingly, as a result of the connection apparatus 1, it may become possible for the previously required free spaces in the motor vehicle 3, in an example between the first drive train component 5 and the motor vehicle component 8, to be able to be reduced or eliminated since these free spaces may no longer required as safety spacing or as a crumple zone in the event of a crash. Consequently, a structural space for accommodating the motor vehicle component 8, for example, the HVB 28 and/or the passenger space, can advantageously be increased with the external dimensions of the motor vehicle 3 remaining unchanged. Consequently, for example, a range as a result of a higher capacity of the HVB 28 or comfort for the passengers can be increased.

Figure 2:
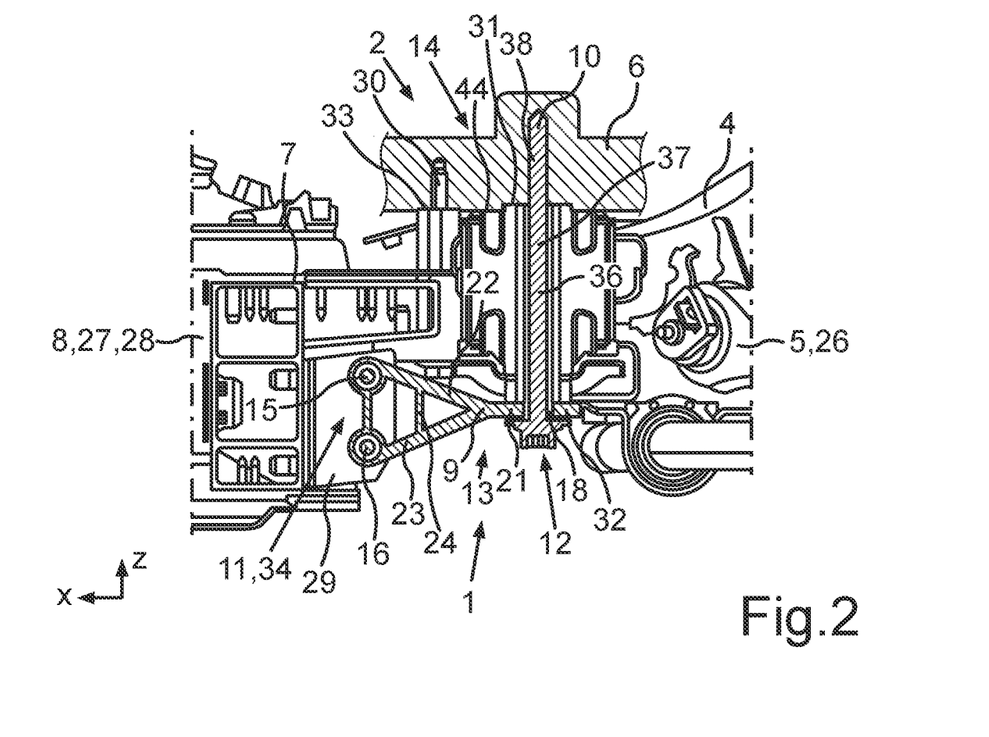
FIG. 2 shows a sectioned illustration of a connection apparatus according to an example.

In FIG. 2, a sectioned illustration of an XZ plane of the connection apparatus 1 according to an example is shown in a mounted state. In this example, the connection apparatus 1 may be mounted on the motor vehicle component 8, in an example on the HVB 28, on the first drive train component 8, in an example on a rear drive 26, and on the body 6 of the motor vehicle 3. In the mounted state, the connection apparatus 1 may be part of an arrangement 2 for the motor vehicle 3 which may comprise the body 6, the first drive train component 5, the motor vehicle component 8 and a connection apparatus 1, wherein the support structure 7 of the motor vehicle component 8 may be connected to the support element 9 via the first interface 11 of the support element 9, and wherein the auxiliary frame 4 of the first drive train component 5 is connected by the auxiliary frame screw 10 at the lower side via the second interface 12 of the support element 9 to the support element 9 and at the upper side to the body 6.

In an example, the connection apparatus 1 has the support element 9 and the auxiliary frame screw 10. The support element 9 may, for example, be constructed in a fork-like manner and have a fork shaft 21 and two fork arms 22, 23 which may be connected by a strut 24 for greater stability.

The respective distal ends of the fork arms 22, 23 may each have a first bore hole 15, 16 which together may correspond to a first interface 11 of the support element 9 for connecting the support element 9 to the support structure 7 of the motor vehicle component 8. For example, the first interface 11 may be able to be connected to a second connection location 34 of the support structure 7. The second connection location 34 may in turn have bore holes which can be connected, for example, in each case by a screw, to the first interface 11 of the support element 9. For example, a console 29 which is connected to the support structure 7 may have the second connection location 34 of the support structure 7.

A distal end of the fork shaft 21 may have a second bore hole 18 which may represent a second interface 12 of the support structure 7 which in an example may be constructed in a positive-locking manner with respect to a screw shaft 36 of the auxiliary frame screw 10.

In an example, the auxiliary frame screw 10 of the connection apparatus 1 may be constructed to connect the auxiliary frame 4 at a lower side 13 of the auxiliary frame 4, in an example at a second connection location 32 of the auxiliary frame 4, to the second interface 12 of the support element 9, and in addition the auxiliary frame 4 at an upper side 14 of the auxiliary frame, 4, in an example at a first connection location 31 of the auxiliary frame 4, to the body 6. The auxiliary frame screw 10 may, for example, have a screw head 35, in an example a thread-free screw shaft 36 and a screw thread 38. In an example, the auxiliary frame screw 10 may have a first shearing face at the first connection location 31 and a second shearing face at the second connection location 32 so that the auxiliary frame screw 10 may be able to be loaded in a double-shearing manner.

In a mounted state, the auxiliary frame screw 10 may connect the support element 9 and the auxiliary frame 4 to each other in a so-called sandwich connection and in the same manner connect, in an example, screw the auxiliary frame 4 to the body. In an example in the mounted state, the screw shaft 36 can be guided through the second bore hole 18 of the support element 9 and through a hole 37 of the auxiliary frame 4, in an example the auxiliary frame bearing 44. The auxiliary frame screw 10 may in an example be screwed into the body 6 so that the screw head 36 connects or presses the second interface 12, for example an edge of the second bore hole 18, on/to a second connection location 32 of the auxiliary frame 4 and a first connection location 31 of the auxiliary frame 4 on/to the body 6 in a non-positive-locking manner.

For example, the support structure 7 of the HVB 28 may be connected by a support structure screw 30 to the body 6 at a first connection location 33 of the support structure 7. In an example, a large number of additional screws or the like may be provided in order to connect the support structure 6 and/or the auxiliary frame 4 to the body 6.

Figure 3:
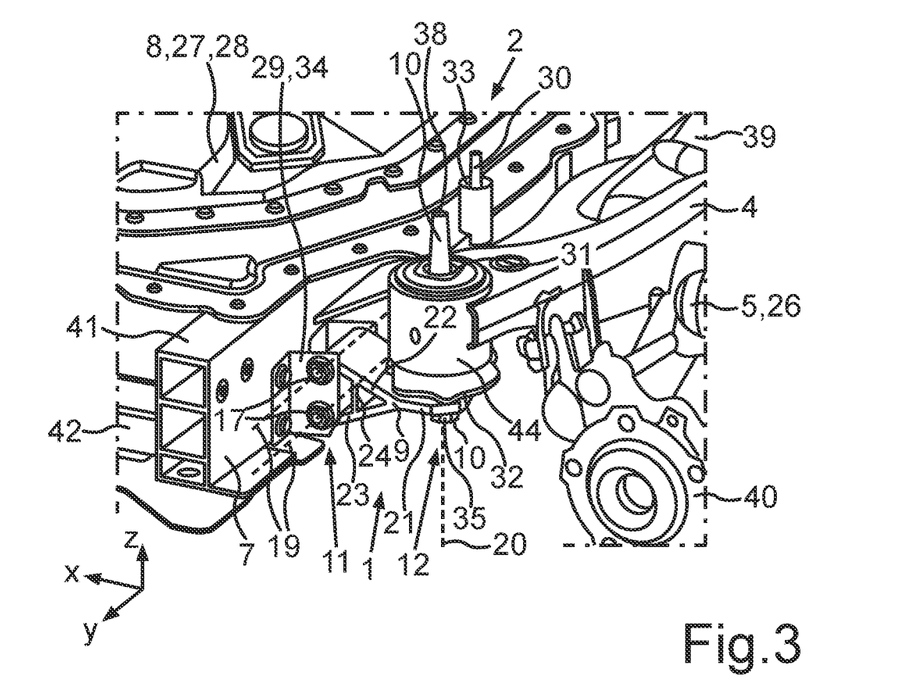
FIG. 3 shows a perspective illustration of a connection apparatus according to an example.

FIG. 3 shows a perspective illustration of the connection apparatus 1 according to an example in a mounted state of the arrangement 2. The description relating to FIG. 2 may also apply to FIG. 3.

In an example, the first drive train component 5 may be in the form of a rear drive 26 which, for example, in addition to other components or sub-assemblies may have an electric motor 39 and a wheel suspension 40. The motor vehicle component 8 may correspond either as a component to the body 6 or, as shown in this example, as a second drive train component 27, in an example to the HVB 28.

The support structure 7 of the HVB 28 may, for example, at least have the transverse profile 41 in the vehicle width direction Y, and at least the longitudinal profile 42 in the longitudinal vehicle direction X. In an example, the console 29 may be connected to the transverse profile 41, in an example, screwed or welded or the like.

For example, central lines 19 of the two first bore holes 15, 16 may be constructed parallel with each other and perpendicularly to a central line 20 of the second bore hole 18. In an example, the central lines 19 of the two first bore holes 15, 16 may be constructed in the vehicle width direction Y and the central line 20 of the second bore hole 18 in the vertical vehicle direction Z. For example, the screws 17 may thereby be able to be assembled from a wide side of the motor vehicle 3 and the auxiliary frame screw 10 from the lower side 13.

Figure 4:
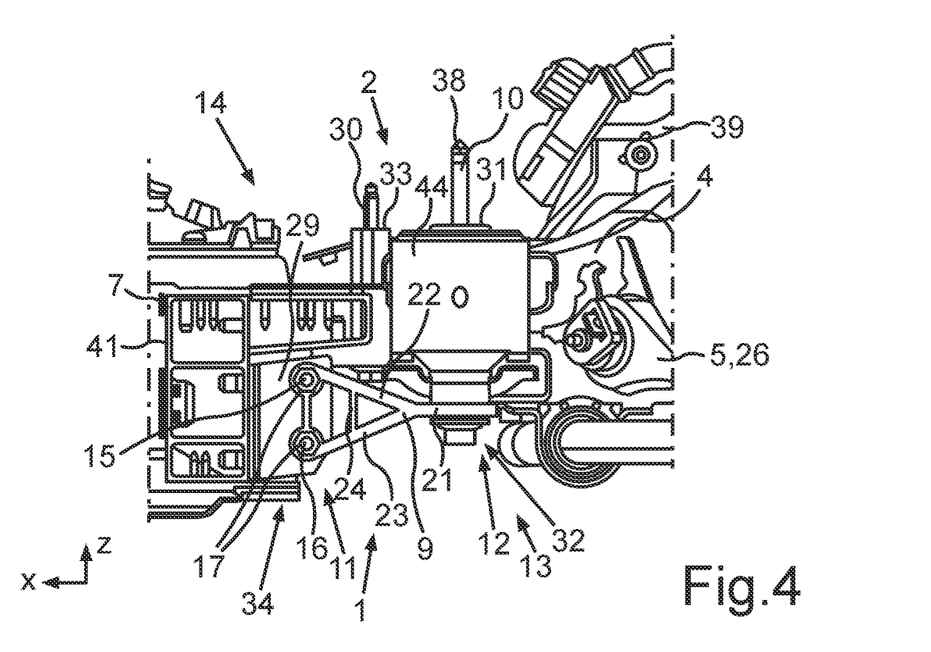
FIG. 4 shows a side view of a connection apparatus according to an example.

FIG. 4 shows a side view of the connection apparatus 1 according to an example. The description relating to FIGS. 2 and 3 may equally apply to FIG. 4.

Figure 5:
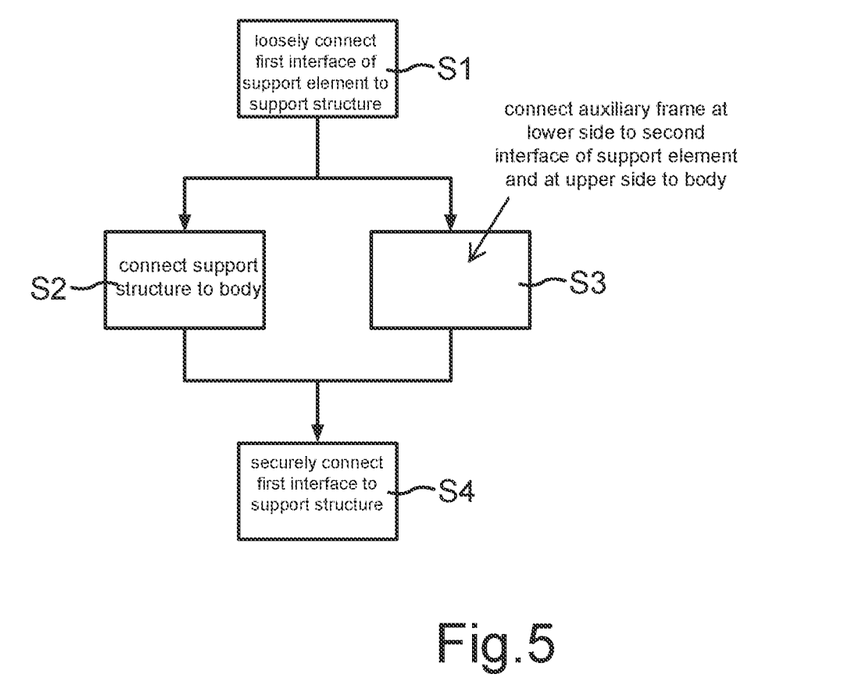
FIG. 5 shows a flow diagram of a method according to an example.

FIG. 5 shows a flow chart of a method according to an example for a double-shearing connection of the auxiliary frame 4 of the first drive train component 5 to the body 6 and to the support structure 7 of the motor vehicle component 8 of the motor vehicle 3. In an example, the first interface 11 of the support element 9 can be connected to the support structure 7 of the motor vehicle component 8 and the auxiliary frame 4 of the first drive train component 5 can be connected by the auxiliary frame screw 10 at the lower side to a second interface 12 of the support element 9 and at the upper side to the body 6.

For example, in a first step S1, the first interface 11 of the support element 9 can be loosely connected to the support structure 7 of the motor vehicle component 8 with play being formed. Subsequently, in a second step S2, the support structure 7 can be connected to the body 6, in an example, by the support structure screw 30. In a step S3 which may follow step S1 and which may, for example, be parallel with step S2, the auxiliary frame 4 can be connected at the lower side to the second interface 12 of the support element 9 and at the upper side to the body 6 by the auxiliary frame screw 10. In a step S4 which follows the steps S1 to S3, the first interface 11 can be securely connected to the support structure 7.

An advantage of such a method may be that a connection of the support structure to the auxiliary frame 4 can initially be enabled in the event of production-related deviations in the shape or in the position with respect to the body 6 of the support structure 7 or the auxiliary frame 4. In this instance, in particular two aspects of the method may be vital. On the one hand, as a result of the use of the support element 9, in an example, as a result of the multicomponent nature, it can be ensured that production-related deviations can be compensated for. On the other hand, as a result of the sequence of the method steps, it can be ensured that the production-related deviations can be compensated for. If such a "compensation function" were not integrated, it may be the case that the connection locations of the motor vehicle component and the auxiliary frame no longer fit the receiving locations of the body. Consequently, an assembly would not be possible or only with significant adjustment complexity.

On the whole, the examples show how a connection can be provided in order to optimize the crash rigidity of the motor vehicle. This double-shearing, multi-component connection enables, for example, the HVB to be brought as close as possible to the auxiliary frame, but can in addition thereto absorb significantly higher loads.

Furthermore, the incorporation of the support structure by the support element in the auxiliary frame screw connection (so-called sandwich screw connection) below, for example, the front auxiliary frame bearing enables a significantly higher load-bearing capacity of the auxiliary frame screw. Specifically, this may mean that the auxiliary frame screw does not have to carry alone the entire load thereof via the connection to the body above the auxiliary frame bearing, but instead can also be supported on the support element below the auxiliary frame bearing. The load level may be significantly increased, or vice versa, the loading of the auxiliary frame screw may be divided over two regions.

An example of a central point of the examples of the invention may be the additional interface, via the support element. The additional interface, in this instance the first interface of the support element may, primarily be used to compensate for production or position tolerances of the HVB and the auxiliary frame as may occur during the assembly or the service/customer service (replacement or repair of the HVB, the auxiliary frame or both components) in a plurality of, for example, all, spatial directions. By taking into account all necessary tolerances via the bore holes of the first interface, both components (support structure of the HVB, auxiliary frame of the first drive train component) can be positioned with respect to each other in such a manner that the function of the connection can be ensured in spite of deviations in the form or position of both components which are intended to be coupled. If such a "compensation function" were not integrated, it may be the case that the hole patterns of the HVB and the auxiliary frame no longer fit the receiving locations of the body and an assembly is thus not possible or only with considerable adjustment complexity.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in *Superguide* v. *DIRECTV*, 358 F3d 870, 69 USPQ2d 1865 (Fed. Cir. 2004).

The invention claimed is:

1. A connection apparatus of a motor vehicle for a double-shearing connection of an auxiliary frame of a first drive train component to a body and to a support structure of a motor vehicle component, the connection apparatus comprising:
    a support element having a first interface to connect the support element to the support structure of the motor vehicle component, and a second interface to connect the support element to the auxiliary frame; and
    an auxiliary frame screw constructed to connect the auxiliary frame at a lower side of the auxiliary frame to the second interface of the support element and at an upper side of the auxiliary frame to the body.

2. The connection apparatus according to claim 1, wherein
    the first interface has at least one first bore hole to connect the support element to the support structure of the motor vehicle component by a screw,
    the second interface has a second bore hole to connect the support element to the auxiliary frame by the auxiliary frame screw,
    the at least one first bore hole constructed so that a central line of the at least one first bore hole of the first interface is perpendicular to a central line of the second bore hole of the second interface.

3. The connection apparatus according to claim 2, wherein
    the support element is constructed in a fork-like manner and has a fork shaft and two fork arms,
    the at least one first bore hole of the first interface includes two first bore holes, wherein one of the two first bore holes is formed at a respective end of the two fork arms,
    the second interface is connected at an end of the fork shaft.

4. A configuration of an arrangement of components in a motor vehicle to provide a double-shearing connection of the components in the motor vehicle that includes a body, a first drive train component of the components, and a motor vehicle component of the components to provide the double-shearing connection of an auxiliary frame of the first drive train component to the body and to a support structure of the motor vehicle component, the configuration of the arrangement comprising:
    a connection apparatus configured to include,
        a support element having a first interface to connect the support element to the support structure of the motor vehicle component, and a second interface to connect the support element to the auxiliary frame; and
        an auxiliary frame screw constructed to connect the auxiliary frame at a lower side of the auxiliary frame to the second interface of the support element and at an upper side of the auxiliary frame to the body, so that the support structure of the motor vehicle component is connected to the support element via the first interface of the support element, and the auxiliary frame of the first drive train component is connected to the support element via the auxiliary frame screw at the lower side of the auxiliary frame via the second interface of the support element and at the upper side of the auxiliary frame to the body.

5. The configuration of the arrangement according to claim 4, wherein
    the first drive train component corresponds to a front drive or a rear drive for the motor vehicle.

6. The configuration of the arrangement according to claim 4, wherein
the motor vehicle component corresponds to a second drive train component or a component of the body.

7. The configuration of the arrangement according to claim 4, wherein
the motor vehicle component corresponds to an energy store for the motor vehicle, the energy store including a high-voltage battery.

8. A motor vehicle comprising the configuration of the arrangement according to claim 4.

9. A motor vehicle comprising the configuration of the arrangement according to claim 5.

10. A motor vehicle comprising the configuration of the arrangement according to claim 6.

11. A motor vehicle comprising the configuration of the arrangement according to claim 7.

12. The motor vehicle according to claim 8, wherein
the first interface has at least one first bore hole to connect the support element to the support structure of the motor vehicle component by a screw,
the second interface has a second bore hole to connect the support element to the auxiliary frame by an auxiliary frame screw,
the at least one first bore hole constructed so that a central line of the at least one first bore hole of the first interface is perpendicular to a central line of the second bore hole of the second interface,
the connection apparatus arranged in a lateral edge region of the motor vehicle in a vehicle width direction (Y) and in a lower edge region of the motor vehicle in a vertical vehicle direction (Z), and
the central line of the at least one first bore hole of the first interface is formed in the vehicle width direction (Y) and the central line of the second bore hole of the second interface is formed in the vertical vehicle direction (Z).

13. A method of double-shearing connection of an auxiliary frame of a first drive train component to a body and to a support structure of a motor vehicle component of a motor vehicle, the method comprising
connecting a first interface of a support element to the support structure of the motor vehicle component,
connecting an auxiliary frame of the first drive train component via an auxiliary frame screw at a lower side of the auxiliary frame to a second interface of the support element and at an upper side of the auxiliary frame to the body.

14. The method according to claim 13 further comprising:
loosely connecting the first interface of the support element to the support structure of the motor vehicle component with play being formed;
connecting the support structure to the body after the loosely connecting;
connecting the auxiliary frame at the lower side to the second interface of the support element and at the upper side to the body by via the auxiliary frame screw after the loosely connecting; and
securely connecting the first interface to the support structure after the loosely connecting, and the connecting of the support structure and the connecting of the auxiliary frame.

* * * * *